(12) United States Patent
Kakumoto et al.

(10) Patent No.: US 11,119,468 B2
(45) Date of Patent: Sep. 14, 2021

(54) MACHINE TOOL HAVING FUNCTION OF AUTOMATICALLY CORRECTING MACHINING PROGRAM IN TOOL REPLACEMENT

(71) Applicant: NAKAMURA-TOME PRECISION INDUSTRY CO., LTD., Ishikawa (JP)

(72) Inventors: Masahiko Kakumoto, Kanazawa (JP); Kenji Ohara, Kanazawa (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 61 days.

(21) Appl. No.: 16/812,637

(22) Filed: Mar. 9, 2020

(65) Prior Publication Data

US 2020/0285221 A1    Sep. 10, 2020

(30) Foreign Application Priority Data

Mar. 8, 2019    (JP) .............................. JP2019-042145

(51) Int. Cl.
  *G05B 19/4155*  (2006.01)
  *G05B 19/4093*  (2006.01)
(52) U.S. Cl.
  CPC ... *G05B 19/4155* (2013.01); *G05B 19/40938* (2013.01); *G05B 2219/36043* (2013.01)

(58) Field of Classification Search
  None
  See application file for complete search history.

(56) References Cited

U.S. PATENT DOCUMENTS

| 5,117,169 | A | * | 5/1992 | Kakino | ................ | G05B 19/401 |
| | | | | | | 318/578 |
| 5,513,113 | A | | 4/1996 | Okada et al. | | |
| 2006/0104751 | A1 | * | 5/2006 | Arai | ....................... | B23Q 39/04 |
| | | | | | | 414/222.01 |

FOREIGN PATENT DOCUMENTS

| JP | H05-337787 A | | 12/1993 |
| JP | 2005224942 A | * | 8/2005 |

* cited by examiner

*Primary Examiner* — Ryan A Jarrett
(74) *Attorney, Agent, or Firm* — Oliff PLC

(57) ABSTRACT

A machine tool having a function of automatically correcting a machining program in tool replacement includes: a signal output unit that outputs a signal when a tool is replaced; a machining unit that temporarily machines a workpiece to a predetermined target dimension using the replaced tool; a measurement unit that measures an actual dimension of the temporarily machined workpiece; a detection unit that detects a dimensional difference between the measured actual dimension and the target dimension; and an automatic correction unit that automatically corrects the machining program based on the dimensional difference, wherein the machining unit actually machines the workpiece based on the automatically corrected machining program.

8 Claims, 4 Drawing Sheets

MACHINE TOOL HAVING FUNCTION OF AUTOMATICALLY CORRECTING MACHINING PROGRAM IN TOOL REPLACEMENT

CROSS REFERENCE TO RELATED APPLICATION

This application is based upon and claims the benefit of priority to Japanese Patent Application No. 2019-042145 filed on Mar. 8, 2019, the entire contents of which is incorporated herein by reference.

BACKGROUND

The present disclosure relates to a machine tool subjected to NC control for machining such as cutting, and particularly to a machine tool having a function of automatically correcting an execution program in tool replacement.

For machining a workpiece using a machine tool, various cutting tools or the like are changed and used depending on purposes of machining.

Such a tool is worn away due to repeated use for cutting. The tool is replaced with new one when it comes to the end of its life due to wear or the like.

JP-A-5-337787 discloses a machine tool that automatically obtains a boring diameter correction signal particularly in highly accurate boring. This machine tool uses a touch sensor to be brought into contact with an inner surface of a bore at three points for measurement after rough machining of a workpiece. The boring diameter correction signal is obtained from a measured boring diameter and a desired boring diameter, and output to boring diameter control means. This allows highly accurate boring.

BRIEF DESCRIPTION OF THE DRAWINGS

FIG. 1A illustrates a temporary machining step, FIG. 1B illustrates a temporary machining dimension measuring step, and FIG. 1C illustrates an actual machining step;

DESCRIPTION OF EMBODIMENTS

Figure 1A:
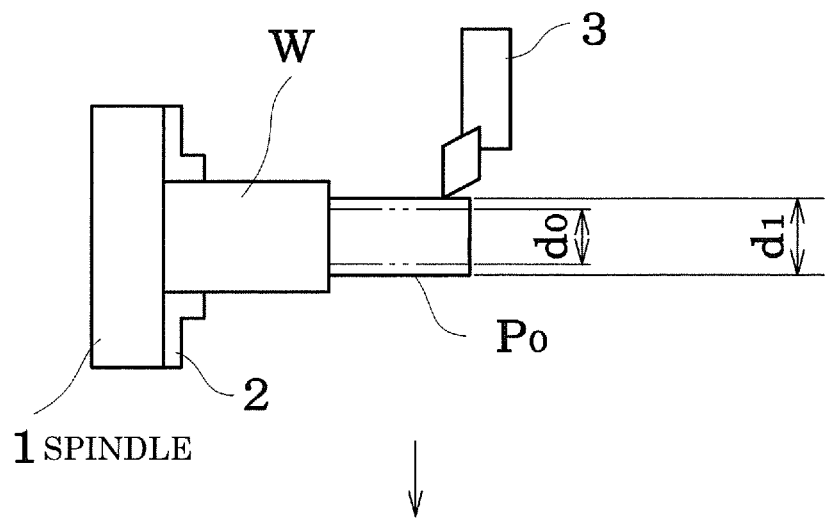
FIGS. 1A to 1C illustrate machining steps after tool replacement in a machine tool according to an embodiment of the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

An object of the present disclosure is to provide a machine tool having a function of automatically correcting a machining program in tool replacement.

In accordance with one of some embodiments, there is provided a machine tool having a function of automatically correcting a machining program in tool replacement, comprising:

a signal output unit that outputs a tool replacement signal when a tool is replaced;

a machining unit that temporarily machines a workpiece to a target dimension using the replaced tool when the tool replacement signal is output;

a measurement unit that measures an actual dimension of the temporarily machined workpiece;

a detection unit that detects a dimensional difference between the measured actual dimension and the target dimension; and an automatic correction unit that automatically corrects the machining program based on the dimensional difference, wherein the machining unit actually machines the workpiece based on the automatically corrected machining program.

The machine tool refers to one using a lathe, a miller, a grinding machine, a combined processing machine, a cutting tool, or the like.

The tool replacement may be automatically or manually performed.

The detection unit of tool replacement may be automatic detection unit or detection unit manually turned on.

The temporary machining refers to machining to a temporary target dimension before machining to a machining dimension required by a product or the like.

For example, for outer diameter machining, the temporary machining refers to machining to an outer diameter dimension larger than a predetermined machining tolerance, and for inner diameter machining, the temporary machining refers to machining to an inner diameter dimension smaller than a predetermined machining tolerance.

In the disclosure, the actual machining refers to machining to fall within a tolerance of a predetermined target dimension required by the product, and may refer to finishing.

Before finishing of the workpiece, pre-finishing such as rough machining or semi-finishing is sometimes performed. Specifically, the actual machining can include finishing of the workpiece and pre-finishing performed before the finishing. In this case, a target dimension of temporary machining in tool replacement can include a temporary finishing dimension set for the finishing, and a pre-finishing dimension set for the pre-finishing.

The pre-finishing can be performed to fit the temporary finishing dimension, and a machining allowance of the pre-finishing can be reduced correspondingly to a reduction in machining allowance from the target dimension.

With the machining tool according to one of some embodiments, in first machining after tool replacement, the temporary machining is once performed with a machining allowance smaller than a machining allowance based on a product dimension, a difference between an actual measurement value of a temporary machining dimension and a temporary machining dimension on the machining program is detected, and the machining program is automatically corrected based on the difference, thereby eliminating the need for manual trial machining and correction by an operator. This reduces burden on the operator.

Further, for second and subsequent machining, normal continuous machining can be performed based on the automatically corrected machining program, thereby improving machinability.

Figure 3:
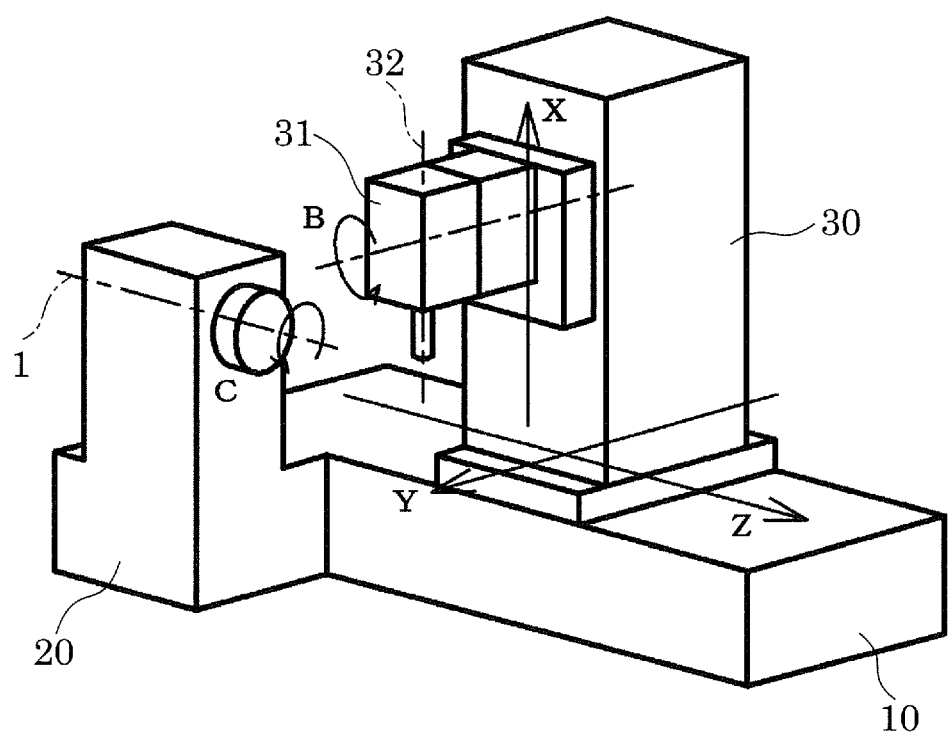
FIG. 3 schematically illustrates a model of the machine tool according to the embodiment of the disclosure.

FIG. 3 schematically illustrates a model of a machine tool. FIG. 3 illustrates, for example, a turning center with one spindle, but an opposed turning center with two spindles may be allowed. In FIG. 3, a spindle stock 20 is secured to a bed 10 of the machine tool. A tool spindle stock 30 is moved relative to the bed 10 along two axial directions Y and Z perpendicular to each other in a horizontal plane. The spindle stock 20 includes a spindle 1 subjected to C-axis control. A workpiece (not illustrated) is held and rotated by the spindle 1. The tool spindle stock 30 includes a tool rest 31 moved along a vertical direction X and subjected to B-axis control. The tool rest 31 includes a tool spindle 32. A tool (not illustrated) attached to the tool spindle 32 is translatable along X, Y, and Z axes perpendicular to each other (crossing each other in a broad sense), and swingable around a B axis.

Figure 4:
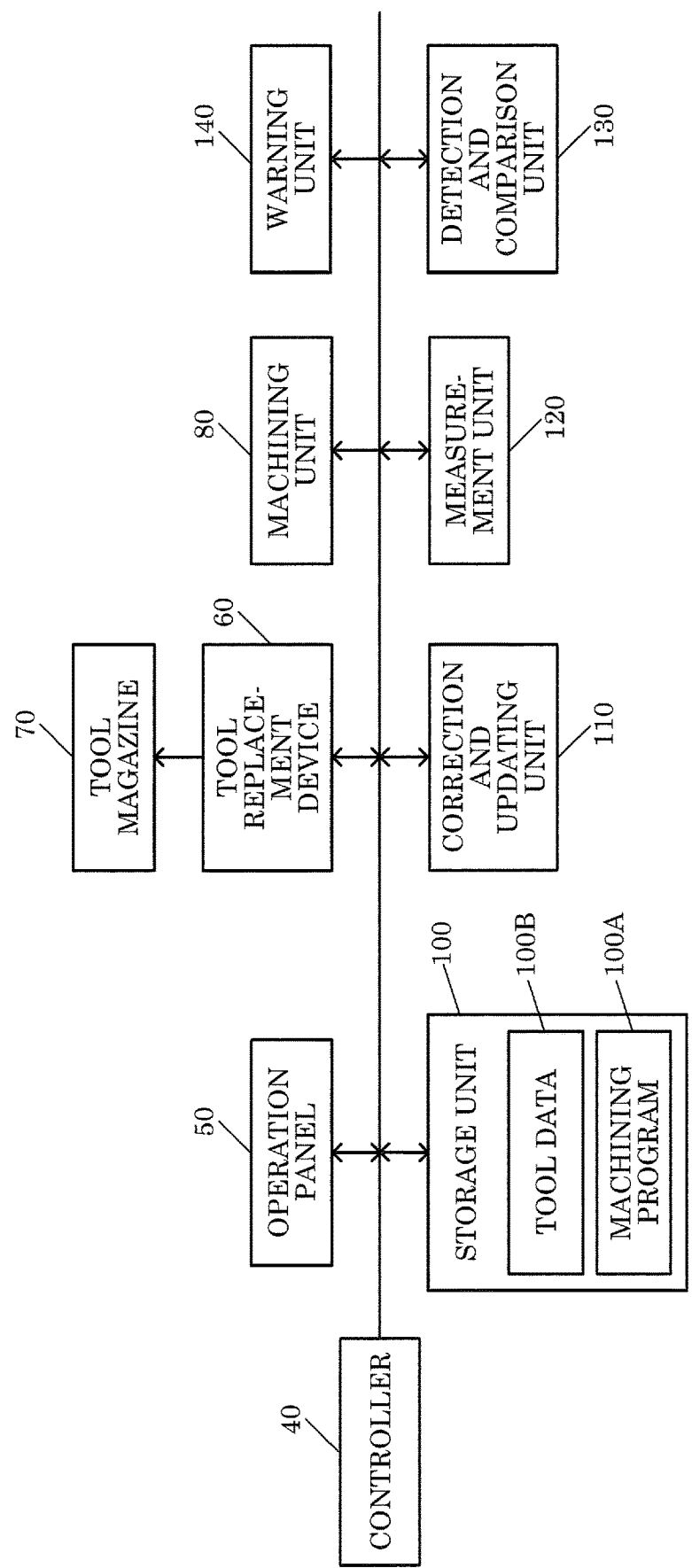
FIG. 4 is a block diagram of the machine tool according to the embodiment of the disclosure.

FIG. 4 is a block diagram of the machine tool. A controller 40 controls components described below. An operation panel 50 includes a keyboard and a display, through which various kinds of information are input and output. A tool replacement device 60 attaches, to the tool spindle 32 in FIG. 3, a tool selected from a plurality of tools held in a tool magazine 70. The tool replacement device 60 returns, to the tool magazine 70, a tool having been attached to the tool spindle 32. A machining unit 80 uses the tool attached to the tool spindle 32 to machine a workpiece held and rotated by the spindle 1. Thus, the machining unit 80 includes the spindle 1, the spindle stock 20, the tool spindle stock 30, the tool rest 31, the tool spindle 32, and the like in FIG. 3.

The machine tool can include a rewritable storage unit 100. The storage unit 100 includes a machining program storage unit 100A. The storage unit 100A can store machining programs for the plurality of tools held in the tool magazine 70. The storage unit 100 can include a tool data storage unit 100B. The storage unit 100B can store data for the plurality of tools held in the tool magazine 70. In particular, the storage unit 100B can register, as tool data, usage history of the plurality of tools used in the machine tool. The usage history of the tools can include at least data on whether or not the tools have been used in the machine tool. As the storage units 100A, 100B, a hard disk, an optical disk, a flash memory, or other memories can be used. A correction and updating unit 110 can correct the machining programs stored in the storage unit 100, or update the data stored in the storage unit 100. An operation of the correction and updating unit 110 will be described later.

The machine tool can include a measurement unit 120. The measurement unit 120 measures a machining dimension of the workpiece fitted to the spindle 1. The measurement unit 120 can include, for example, a probe that can be moved up and down relative to the tool rest 31 in FIG. 3 in the vertical direction X in FIG. 1, and a stylus provided at a tip of the probe.

The machine tool can include a detection and comparison unit 130. The detection and comparison unit 130 can detect a dimensional difference between a measured actual dimension and a target dimension. The detection and comparison unit 130 can further compare the dimensional difference with a threshold value. The machine tool can include a warning unit 140. The warning unit 140 can give a warning when the dimensional difference is out of the threshold value as a result of comparison by the detection and comparison unit 130.

Next, with reference to FIGS. 1A to 2, lathe-turning as an exemplary operation of the machine tool according to this embodiment will be described, but machining is not limited thereto.

First, the operation panel 50 is operated and so on to select a tool and a machining program used for machining of a workpiece. When the tool replacement device 60 automatically replaces or an operator manually replaces a tool with a new one, a tool replacement signal is output (step $S_1$ in FIG. 2). The tool replacement device 60 replaces a tool having been fitted to the tool spindle 32 with the tool selected from the tool magazine. At this time, for example, the tool replacement device 60 can output a tool replacement signal. In this case, the tool replacement device 60 is detection unit that detects tool replacement, and also signal output unit that outputs a tool replacement signal. Instead of the tool replacement device 60, the operation panel 50 through which information for selecting a tool is input may serve as the signal output unit and output a tool replacement signal. Then, for example, even if the operator manually replaces a tool, the operation panel 50 can output a tool replacement signal.

Here, a plurality of workpieces machined using the same tool and the same machining program after output of a tool replacement signal are used as one lot. First, machining of a first workpiece among the plurality of workpieces in one lot will be described.

Figure 1B:
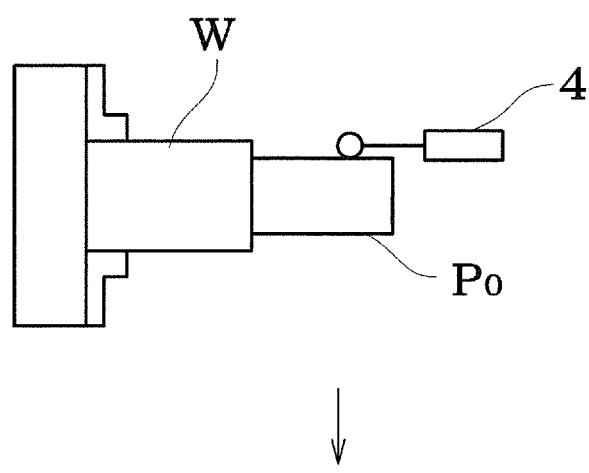
Figure 2:
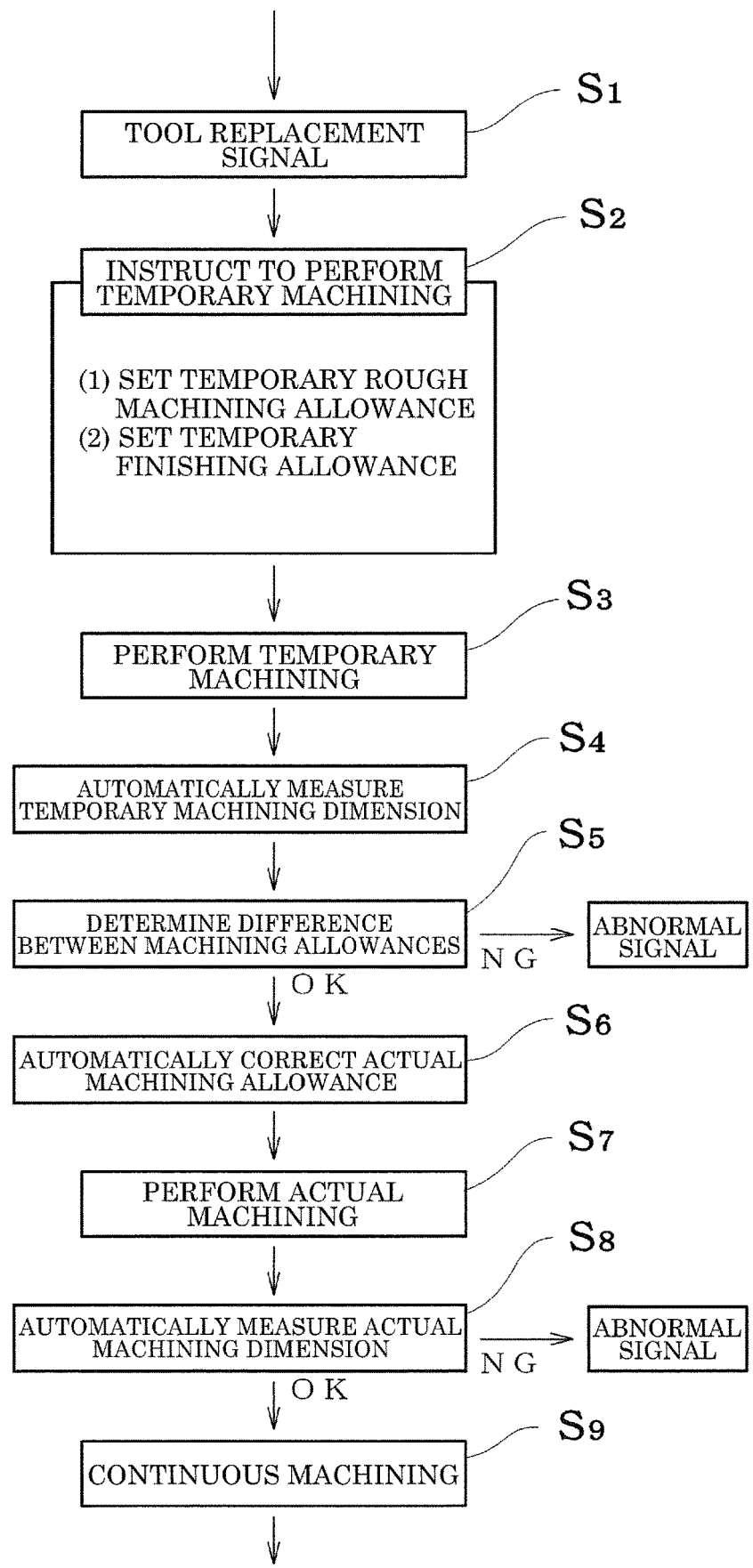
FIG. 2 is a flowchart of the machining steps after tool replacement in FIGS. 1A to 1C.

When a tool replacement signal is output, for example, the controller 40 outputs an instruction to perform temporary machining in the machining unit 80 (step $S_2$ in FIG. 2). FIG. 1A schematically illustrates a temporary machining state, and FIG. 1B schematically illustrates a temporary machining dimension measuring state. When the temporary machining instruction is output, a temporary machining program with a smaller machining allowance is executed in place of a program for continuous actual machining so far to fit a product dimension of a workpiece. With reference to FIG. 1A, such a state will be descried.

Figure 1C:
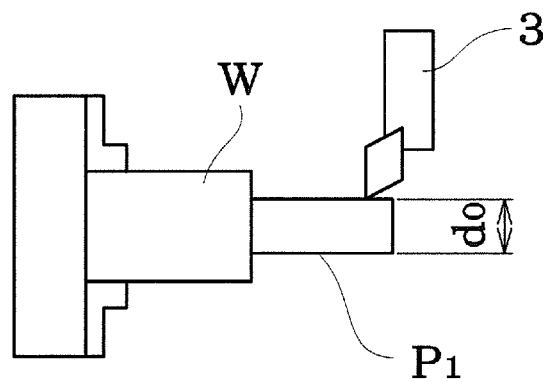

FIG. 1A illustrates an example in which a workpiece W is gripped by a chuck 2 of the spindle 1 rotationally controlled, and a tool 3 fitted to the tool spindle 32 is used for lathe-turning of an outer diameter of the workpiece W under NC control.

A target dimension of temporary machining is set to a temporary machining dimension $d_1$ that is an outer diameter dimension slightly larger than an actual machining dimension $d_0$ of a product requested by the workpiece W. For an inner diameter machining, a target dimension of temporary machining is set to an inner diameter dimension slightly smaller than the actual machining dimension.

If rough machining is performed before finishing, for example, as illustrated in step $S_2$ in FIG. 2, the target dimension of temporary machining may be separately set to (1) a temporary rough machining allowance and a (2) temporary finishing allowance. Temporary rough machining may be omitted or further divided into a plurality of pre-finishing processes.

The operation panel 50 or the like of the machine tool may include a screen for setting a temporary machining condition depending on a type of a replacement tool or an actual machining pattern to allow a target dimension (machining allowance) of temporary machining to be previously selected.

After a temporary machining allowance is set, temporary machining is performed (step $S_3$ in FIG. 2).

After the temporary machining is completed, the measurement unit 120 including the stylus 4 as illustrated in FIG. 1B measures an outer diameter dimension $P_0$ after the temporary machining (step $S_4$ in FIG. 2). The probe that supports the stylus 4 is moved vertically downward relative to the tool rest 31 in FIG. 3, and further moved together with the tool rest 31 in the X, Y, and Z directions, thereby allowing measurement of the outer diameter dimension $P_0$ with the tool 3 being fitted to the tool spindle 32.

The detection and comparison unit 130 automatically detects a difference between the actual measurement dimension $P_0$ after the temporary machining and a target dimension P of the temporary machining (step $S_5$ in FIG. 2).

A threshold value of the difference can be previously set. In this case, the detection and comparison unit 130 can compare whether or not the difference is within the threshold value. From the comparison result, if the difference is within the threshold value, an actual machining program is automatically corrected (step $S_6$ in FIG. 2) based on the difference so that a target dimension $d_0$ of actual machining as a product dimension is reached. The correction and updating unit 110 performs this automatic correction for a corresponding machining program in the storage unit 100A.

In contrast, if the difference is out of the threshold value, the detection and comparison unit 130 outputs an abnormal signal, and the warning unit 140 can give a warning to the operator.

If the difference is within the threshold value, and an actual machining allowance is accordingly automatically corrected, the rough machining allowance returns to its original one, and actual finishing is performed based on the automatically corrected program (step $S_7$ in FIG. 2).

When the actual machining is completed to fit the target dimension of actual machining of the workpiece W, the measurement unit 120 automatically measures an outer diameter dimension $P_1$ after the actual machining. If the dimension after the actual machining is within a predetermined dimension tolerance, the temporary machining step is omitted for subsequent workpieces in one lot, and continuous machining is performed according to the actual machining program.

If the dimension after the actual machining is out of the predetermined tolerance, an abnormal signal is output, and for example, the warning unit 140 gives a warning to the operator, and the operator deals with the abnormality.

The automatic correction of the machining program can be performed for each lot with every tool replacement. This is because replacement tools may have different machining dimensions for each replacement due to wear of the tools themselves or attachment errors to the tool spindle.

Not limited to the above, the automatic correction of the machining program may be performed, for example, for a new tool that is first used in the machine tool. In this case, it can be determined whether or not the replaced tool is first used in the machine tool with reference to tool usage history data in the storage unit 100B. The correction and updating unit 110 updates the tool usage history data in the storage unit 100B for a tool that has been used, and writes additional usage history. Then, the tool that has been used may be excluded from the automatic correction of the machining program.

What is claimed is:

1. A machine tool having a function of automatically correcting a machining program in tool replacement, comprising:
   a signal output unit that outputs a tool replacement signal when a tool is replaced;
   a machining unit that temporarily machines a workpiece to a target dimension using the replaced tool when the tool replacement signal is output;
   a measurement unit that measures an actual dimension of the temporarily machined workpiece;
   a detection unit that detects a dimensional difference between the measured actual dimension and the target dimension; and
   an automatic correction unit that automatically corrects the machining program based on the dimensional difference,
   wherein the machining unit actually machines the workpiece based on the automatically corrected machining program.

2. The machine tool according to claim 1, further comprising a comparison unit that compares the dimensional difference with a threshold value,
   wherein the automatic correction unit automatically corrects the machining program when the dimensional difference is within the threshold value.

3. The machine tool according to claim 2, further comprising a warning unit that gives a warning when the dimensional difference is out of the threshold value.

4. The machine tool according to claim 1, wherein the actual machining is finishing of the workpiece.

5. The machine tool according to claim 1, wherein the actual machining includes finishing of the workpiece and pre-finishing performed before the finishing, and
   the target dimension of temporary machining in tool replacement includes a temporary finishing dimension set for the finishing, and a temporary pre-finishing dimension set for the pre-finishing.

6. The machine tool according to claim 1, further comprising a tool detection unit that detects replacement of the tool, and the signal output unit outputs the tool replacement signal based on a detection result from the tool detection unit.

7. The machine tool according to claim 1, wherein the machining unit performs temporary machining and actual machining of a first workpiece among a plurality of workpieces in one lot to be machined using the replaced tool after the tool replacement signal is output, and temporary machining of the workpieces other than the first workpiece in the one lot is omitted.

8. The machine tool according to claim 1, further comprising:
   a storage unit that stores usage history of a plurality of tools including the tool used in the machine tool; and
   an updating unit that updates the usage history for each of the plurality of tools,
   wherein the signal output unit outputs the signal at the time of replacement with one of the plurality of tools and when the one replaced tool is first used in the machine tool based on the usage history stored for the one replaced tool.

* * * * *